US009731411B2

(12) United States Patent
Uchiyama et al.

(10) Patent No.: US 9,731,411 B2
(45) Date of Patent: Aug. 15, 2017

(54) HYDRAULIC TOOL

(71) Applicant: IZUMI PRODUCTS COMPANY, Nagano (JP)

(72) Inventors: Takeshi Uchiyama, Nagano (JP); Tomoyuki Kitahara, Nagano (JP)

(73) Assignee: Izumi Products Company, Nagano (JP)

( * ) Notice: Subject to any disclaimer, the term of this patent is extended or adjusted under 35 U.S.C. 154(b) by 0 days.

(21) Appl. No.: 15/101,323

(22) PCT Filed: Dec. 10, 2013

(86) PCT No.: PCT/JP2013/083098
§ 371 (c)(1),
(2) Date: Jun. 2, 2016

(87) PCT Pub. No.: WO2015/087397
PCT Pub. Date: Jun. 18, 2015

(65) Prior Publication Data
US 2016/0368128 A1 Dec. 22, 2016

(51) Int. Cl.
*B25F 5/00* (2006.01)
*F16K 17/04* (2006.01)
(Continued)

(52) U.S. Cl.
CPC .............. *B25F 5/005* (2013.01); *B25B 27/10* (2013.01); *F16K 15/18* (2013.01); *F16K 17/048* (2013.01)

(58) Field of Classification Search
CPC ........... B25F 5/005; B25B 27/10; F16K 15/18
(Continued)

(56) References Cited

U.S. PATENT DOCUMENTS 2,759,458 A * 8/1956 Robinson ................ F01B 17/00
261/50.1
4,644,648 A 2/1987 Pellenc
(Continued)

FOREIGN PATENT DOCUMENTS

| JP | 08-150576 A | 6/1996 |
|----|-------------|--------|
| JP | 2000-329056 A | 11/2000 |

OTHER PUBLICATIONS

International Search Report by Japanese Patent Office for corresponding PCT/JP2013/083098 application dated Feb. 18, 2014(4 pages).

(Continued)

*Primary Examiner* — David B Jones
(74) *Attorney, Agent, or Firm* — Capitol City TechLaw, PLLC; Samuel P. Burkholder

(57) ABSTRACT

A hydraulic tool having a body, a frame in which a stationary tool for machining a workpiece and a movable tool are disposed, a cylindrical piston, and a rapid-advance piston connected to the body, wherein the rapid-advance piston has a barrel part being in contact with the piston, a connection part disposed at the rear end of the barrel part and connected to the body, a screw part formed in the connection part, and a D-cut face formed on the barrel part. A fixation member disposed in the body so as to be positioned in the vicinity of the D-cut face is also provided. The D-cut face is formed along a direction orthogonal to a line that connects the center point of the barrel part to the center point of the fixation member, and the rapid-advance piston is prevented from rotating by the fixation member.

3 Claims, 5 Drawing Sheets

(51) Int. Cl.
*F16K 15/18* (2006.01)
*B25B 27/10* (2006.01)

(58) Field of Classification Search
USPC ........................................ 72/453.02
See application file for complete search history.

(56) References Cited

U.S. PATENT DOCUMENTS

| | | | |
|---|---|---|---|
| 5,533,842 A * | 7/1996 | Johnson | B23Q 5/265 |
| | | | 408/130 |
| 7,337,514 B2 | 3/2008 | McKay | |
| 9,016,317 B2 * | 4/2015 | Myrhum, Jr. | F16K 15/18 |
| | | | 137/522 |
| 2005/0183258 A1 | 8/2005 | McKay | |
| 2016/0368128 A1 * | 12/2016 | Uchiyama | B25B 27/10 |

OTHER PUBLICATIONS

Patent Examination Report by Australian Patent Office for corresponding 2013407734 application dated Nov. 24, 2016 (2 pages).

* cited by examiner

HYDRAULIC TOOL

TECHNICAL FIELD

The present invention relates to a hydraulic tool.

BACKGROUND ART

The hydraulic tools using hydraulic pressure include: a type in which a hydraulic motor is driven by using as an electric power source a battery pack in which batteries are built in, a hydraulic pump is driven by the rotational driving of the hydraulic motor to feed the hydraulic pressure to a hydraulic cylinder and move a piston; and a type in which a piston is moved by receiving feed of hydraulic pressure from a hydraulic-pressure feeder which is separately arranged. In addition, for example, the crimping tools in which a movable die as a movable tool is moved by movement of a piston to connect a crimp contact to an end of an electric wire are known (See Patent. Literature 1).

In order to reduce dead time, increase operational efficiency, and reduce operational time of the movable die as the movable tool, a fast-feed piston for quickly moving the movable die in a free state is built in the above hydraulic tools.

FIG. 5 is a cross-sectional view illustrating the structure of a conventional hydraulic tool, FIG. 6 is a cross-sectional view along the line C-C indicated in FIG. 5, and is a magnified sectional view illustrating a rotation stopper for a conventional fast-feed piston.

As illustrated in FIG. 5, a piston 32 and a fast-feed piston 34 are inserted in a body 31 of the conventional hydraulic tool 30. Hereinafter, the body 31 side is referred to as the front end portion, and an oil tank 9 side is referred to as the rear end portion. In addition, in each part, a fixed tool 13 side is referred to as the front end portion, and the oil tank 9 side is referred to as the rear end portion.

<Body 31>

In the body 31 of the conventional hydraulic tool 30, a large, first cylinder chamber 31a, a female thread 31b, and a female thread 31c are formed in the body 31. A connection portion 34a of the fast-feed piston 34 is screwed into the female thread 31b, and the female thread 31c fixes a setscrew 36 as a rotation stopper for the fast-feed piston 34.

<Piston 32>

A piston 32 is arranged in the first cylinder chamber 31a through a rectangular-wire helical spring 33. In addition, a fast-feed piston 34 is inserted in a second cylinder chamber 32a arranged at the end face of the piston 32.

<Fast-Feed Piston 34>

In the fast-feed piston 34, a trunk portion is formed by enlarging the diameter in a front end portion (on the left side in FIG. 5) and a connection portion is formed by reducing the diameter in a rear end portion, and a male thread is formed in the tip end portion of the connection portion 34a. The male thread is screwed into the female thread 31b in the body 31 so that the fast-feed piston 34 is integrally fixed to the body 31. In addition, a male thread 34d is formed in a rear end portion 34e of the trunk portion of the fast-feed piston 34, and a U-nut 35, in which backlash (gap) is eliminated for preventing loosening, is screwed onto the male thread 34d, so that the U-nut 35 is integrated with the fast-feed piston 34.

Further, as illustrated in FIG. 6, a rotation stopper with the U-nut 35 is constituted by using one of four grooves 35a arranged in the U-nut 35.

As illustrated in FIG. 6, the groove 35a is a groove having a U-shaped cross section defined by the lines, c-e, c-d, and d-f.

The lines c-e and d-f are parallel to the line o-g connecting the center point o of the fast-feed piston 34 and the center point g of the setscrew 36. In addition, the line c-d is perpendicular to the line o-g. Further, the contact points of the setscrew 36 and the groove 35a are the points e and f. Furthermore, the setscrew 36 is not in contact with the line c-d, and is close to the line c-d and separated from the line c-d by a gap t.

In other words, the rotation stopper for the conventional fast-feed piston 34 prevents rotation in the loosening direction (indicated by the arrow→-) as illustrated in FIG. 6, by engagement, with the setscrew 36, of the point f on the groove 35a in the U-nut 35 (which is integrally fixed to the fast-feed piston 34).

CITATION LIST

Patent Literature

Patent Literature 1: Japanese Patent Laid-Open No. H08-150576 (FIG. 1)

SUMMARY OF INVENTION

Technical Problem

However, the conventional hydraulic tool 30 has a drawback that the setscrew 36 having a dimension M5 or larger cannot be adopted because the size of the setscrew 36 is limited by the dimension of the groove 35a arranged in the U-nut 35.

In addition, in the case where the female thread 31c has the dimension M3 (See FIG. 5), the female thread 31c with the dimension M3 cannot be easily tapped because the tapping tool for the dimension M3 is thin and the female thread 31c is located deep inside the body 31.

Further, there is a drawback that the setscrew 36 of the dimension M3 does not have strength and durability which are sufficient for the rotation stopping of the fast-feed piston 34.

In view of above, the present invention has been made to solve the above conventional problems, the object of the present invention is to provide a hydraulic tool in which the size of a fixing member for stopping rotation of the fast-feed piston (including a screw member, a setscrew, or the like) is increased, the problem of the insufficient strength of the fixing member is solved, and the durability is improved.

Solution to Problem

In order to solve the aforementioned problems, the invention described in claim 1 is a hydraulic tool (10) including: a body (11); a frame (12) which is detachably connected to the body (11), and in which a fixed tool (13) and a movable tool (14) are arranged, where the fixed tool (13) and the movable tool (14) process a workpiece; a piston (2) which has a tubular shape and is slidably arranged in the body (11) to move the movable tool (14); and a fast-feed piston (4) inserted in the piston (2) and connected to the body (11). The hydraulic tool is characterized in that: the fast-feed piston (4) includes, a trunk portion (4a) arranged in sliding contact with an inner circumference of the piston (2), a connection portion (4b) arranged in a rear end portion (4g) of the trunk portion (4a) and connected to the body (11), a threaded portion (4*d*) formed in the connection portion (4*b*), and a D-cut surface (4*h*) formed on the trunk portion (4*a*); the hydraulic tool (10) further comprises a fixing member (6) which is arranged in the body (11) in contact with the D-cut surface (4*h*); the D-cut surface (4*h*) is formed along a direction perpendicular to a straight line connecting a center point (o) of the trunk portion (4*a*) and a center point (d) of the fixing member (6); and rotation of the fast-feed piston (4) is stopped by the fixing member (6).

The invention according to claim 2 is the hydraulic tool (10) described in claim 1 characterized in that the fixing member (6) is a screw member (6*a*).

The invention according to claim 3 is the hydraulic tool (10) described in claim 1 characterized in that the D-cut surface (4*h*) is formed in plurality, and the D-cut surfaces (4*h*) are four sides of a square in cross-sectional view.

Advantageous Effect of Invention

According to the invention described in claim 1, the U-nut is disused, and Therefore the limitation by the size of the groove 35*a* does not exist. Thus, the size of the fixing member which stops rotation of the fast-feed piston can be increased. Because of this increase, it is possible to provide a hydraulic tool in which the rigidity is increased by approximately three times in the effective cross-sectional area of the fixing member and approximately nine times in the second moment of area, the problem of the insufficient strength of the fixing member is solved, and the durability and the quality are improved.

In addition, since the U-nut, which is conventionally a purchased part, is disused, the number of constituent parts can be decreased, and therefore the cost can be reduced.

According to the invention described in claim 2, the fixing member is a screw member. Therefore, the tap diameter can be increased, and tap machining is facilitated.

According to the invention described in claim 3, the D-cut surfaces are formed on the four sides of a square in cross-sectional view. Therefore, the screw member can be fixed at least by adjusting the fixing position of the fast-feed piston within the range of 90 degrees, so that the fast-feed piston can be connected by securing the connection portion of the fast-feed piston.

DESCRIPTION OF EMBODIMENT

Hereinbelow, an embodiment of the present invention is explained in detail with reference to FIGS. 1 to 4. The same elements bear the same reference numbers through the drawings, and the same explanation is not repeated.

Figure 1:
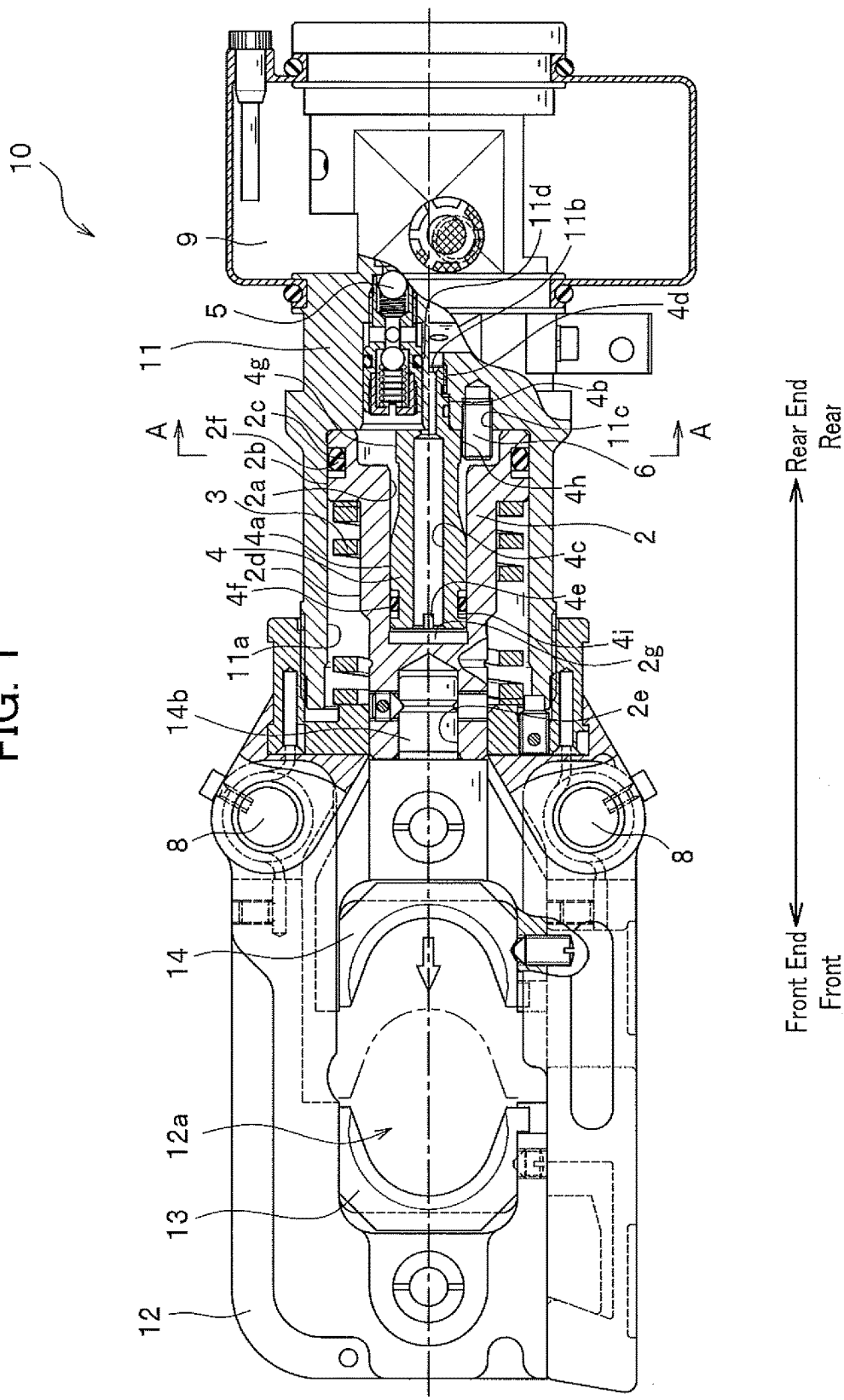
FIG. 1 is a cross-sectional view illustrating the structure of a hydraulic tool according to the present invention.

FIG. 1 is a cross-sectional view illustrating the structure of a hydraulic tool according to the present invention.

Before explaining the rotation stopping of a fast-feed piston 4 in the hydraulic tool 10 according to the present invention, the overall hydraulic tool 10 is explained first.

The hydraulic tool 10 according to the present invention is mainly constituted by a frame 12 and a body 11.

<Structure of Frame 12>

The frame 12 is formed in a U shape, and two sides of a rear edge portion of the frame 12 are detachably connected to the front end portion of the body 11 by pins 8.

An opening 12*a* is formed in a central portion of the U-shaped frame 12. A fixed die 13, which is a fixed tool as one of tools for machining a workpiece, is detachably arranged on a front end portion of the opening 12*a*.

In addition, a movable die 14, which is a movable tool as the other of the tools for machining the workpiece, is detachably arranged on the right end portion of the opening 12*a* of the frame 12 to be opposed to the body 31. Further, the movable die 14 is attached to a piston 2, and moves integrally with the piston 2.

<Structure of Body 11>

As illustrated in FIG. 1, the body 11 includes a large, first cylinder chamber 11*a*. The piston 2 and the fast-feed piston 4 are inserted in the first cylinder chamber 11*a*, where the piston 2 moves the movable die 14, and the fast-feed piston 4 moves the movable die 14 in a fast-feed manner.

In addition, a hydraulic-pressure communication hole 11*d* is arranged at the center of the body 11 in the first cylinder chamber 11*a*, and a female thread 11*b* is formed in the hydraulic-pressure communication hole 11*d*. Further, a female thread 11*c* for a fixing member 6 having the size M5, which is larger than the conventional size M3, is formed in a vicinity of the hydraulic-pressure communication hole 11*d*.

<Structure of Piston 2>

The piston 2 is inserted in the first cylinder chamber 11*a*. A diameter-enlarged portion 2*b* is arranged at the rear end of the outer circumference of the piston 2, an O-ring groove 2*c* is formed in the diameter-enlarged portion 2*b*, and an O-ring 2*f* is fitted into the O-ring groove 2*c*. In addition, a diameter-reduced portion 2*d* having a reduced outer diameter is arranged on the front end side of the diameter-enlarged portion 2*b* of the piston 2. A rectangular-wire helical spring 3, which biases the piston 2 toward the original position, is fitted in the space produced by the diameter-reduced portion 2*d*.

Further, an attachment hole 2*e* is arranged on a front end face of the piston 2, and an attachment portion 14*b* of the movable die 14 is fitted in the attachment hole 2*e*, so that the movable die 14 is integrally fixed to the piston 2.

Furthermore, a second cylinder chamber 2*a* is arranged in a central portion of the rear end face of the piston 2, and the fast-feed piston 4 (which is explained later) is inserted in the second cylinder chamber 2*a*.

Moreover, a third cylinder chamber 2*g* is formed by the front end face of the inserted fast-feed piston 4 and the second cylinder chamber 2*a*.

<Structure of Fast-Feed Piston 4>

Figure 2A:
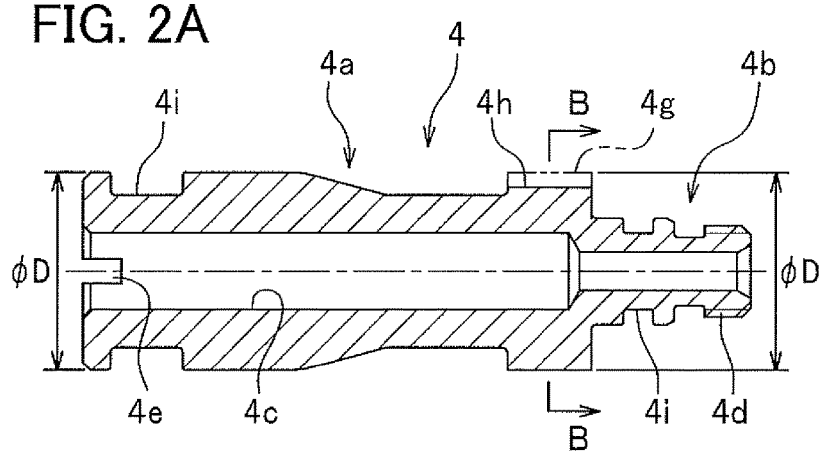
FIG. 2A is a cross-sectional view of a fast-feed piston.
Figure 2B:
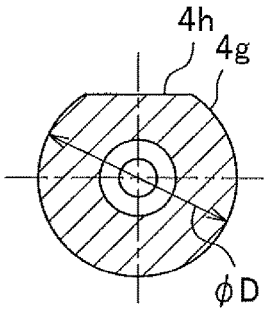
FIG. 2B is a cross-sectional view along the line B-B indicated in FIG. 2A in the case with a single D-cut surface on a single side.
Figure 2C:
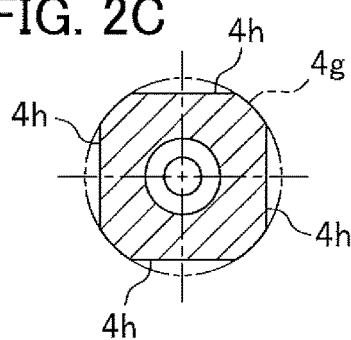
FIG. 2C is a cross-sectional view in the case with D-cut surfaces on four sides.
Figure 2D:
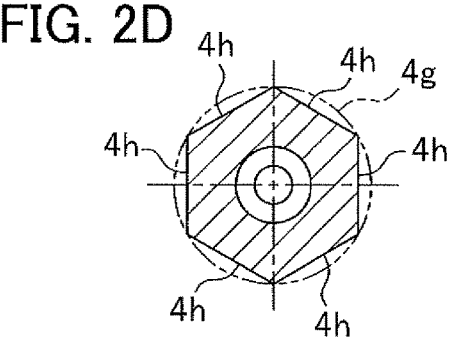
FIG. 2D is a cross-sectional view in the case with D-cut surfaces on six sides.

FIG. 2A is a cross-sectional view of the fast-feed piston, FIG. 2B is a cross-sectional view along the line B-B indicated in FIG. 2A in the case with a single D-cut surface on a single side, FIG. 2C is a cross-sectional view in the case with D-cut surfaces on four sides, and FIG. 2D is a cross-sectional view in the case with D-cut surfaces on six sides.

As illustrated in FIG. 2A, the fast-feed piston 4 is constituted by a cylindrical trunk portion 4a and a connection portion 4b. In addition, a through-hole 4c, through which operating oil (hydraulic pressure) passes, is bored in the center of the fast-feed piston 4.

In addition, an O-ring groove 4i is formed on the outer circumference of the trunk portion 4a of the fast-feed piston 4, and an O-ring 4f (See FIG. 1) is fitted into the O-ring groove 4i. Further, the trunk portion 4a is inserted into the second cylinder chamber 2a of the piston 2 (See FIG. 1).

As illustrated in FIG. 2B, a D-cut surface 4h on a single side is arranged at a rear end portion 4g of the fast-feed piston 4. Such a D cut is possible.

The D cut is a process of cutting an outer circumferential portion of a cylindrical shaft to produce a flat face on one side and a D shape in planar view.

For example, in the case where a cylindrical shaft is rotated by spanner engagement, the spanner engagement is facilitated by arranging two parallel sides on the circumference of the cylindrical shaft, i.e., by arranging two D cuts.

The advantages of the D cuts are taken by a rotation stopping device realized by a combination of the D-cut surface 4h arranged in the fast-feed piston 4 and the fixing member 6. For example, the rear end portion 4g with the D-cut surface 4h on the single side may be processed to form a square with four sides as illustrated in FIG. 2C, or a hexagon with six sides as illustrated in FIG. 2D. In the case with D-cut surfaces on six sides, surface alignment can be performed by rotation of at most 60 degrees.

Further, a small O-ring groove 4i is formed in a vicinity of the root of the connection portion 4b, which is located on the rear end side of the fast-feed piston 4 and has a reduced diameter, and an O-ring 4f which is different in size is fitted into the O-ring groove 4i. Furthermore, a male thread 4d constituting a threaded portion is formed on the outer circumference of the tip end portion of the connection portion 4b.

In addition, a slot 4e is arranged in the front end portion of the fast-feed piston 4. This slot is a groove for installing the fast-feed piston 4 in the body 11 by inserting and turning a flat-bladed screwdriver.

<Rotation Stopping of Fast-Feed Piston with D-Cut Surface on Single Side>

Structures of the rotation stopper for the fast-feed piston 4 in the hydraulic tool 10 according to the present invention are explained.

Figure 3:
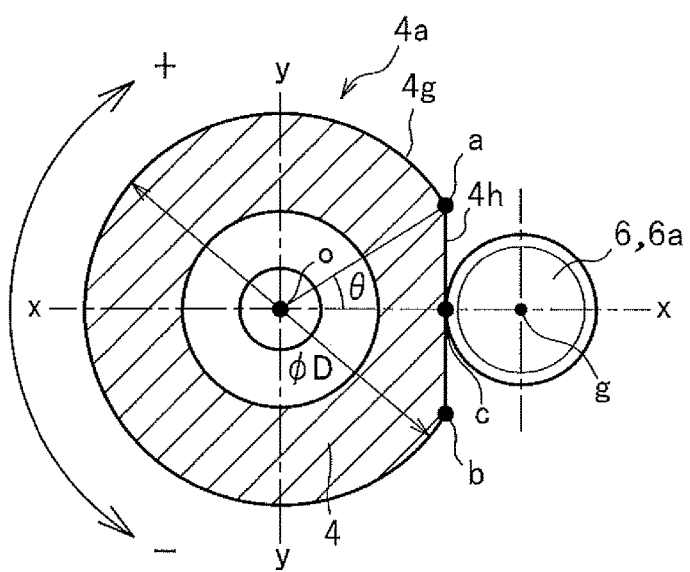
FIG. 3 is a magnified cross-sectional view along the line A-A indicated in FIG. 1 in the case with a single D-cut surface on a single side.

As illustrated in FIG. 3, a single D-cut surface 4h is formed (at a single position) on the outer circumferential portion of the rear end portion 4g of the fast-feed piston 4 to form a single side in cross-sectional view.

In addition, the D-cut surface 4h perpendicular to the center line o-g is formed along the line a-b. Further, the D-cut surface 4h is in contact with a screw member 6a as the fixing member 6 at the point c.

Furthermore, although the size of the setscrew in the conventional structure is M3, the screw member 6a having the increased size M5 is arranged to limit loosening of the fast-feed piston 4 in the present embodiment. That is, since the setscrew 6 (See FIG. 1) having the increased size is deeply screwed in, the setscrew 6 is fixed, and the rotation stopping of the fast-feed piston 4 is sufficiently functional.

However, in the case with a single D-cut surface on a single side, surface alignment requires rotation of at most 360 degrees.

<Rotation Stopping of Fast-Feed Piston with D-Cut Surfaces on Four Sides>

Figure 4:
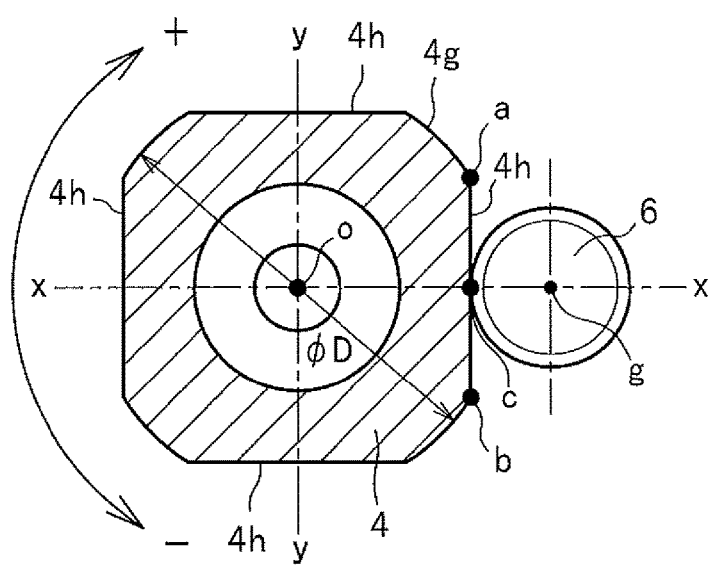
FIG. 4 is a magnified cross-sectional view along the line A-A indicated in FIG. 1 in the case with D-cut surfaces on four sides.
Figure 5:
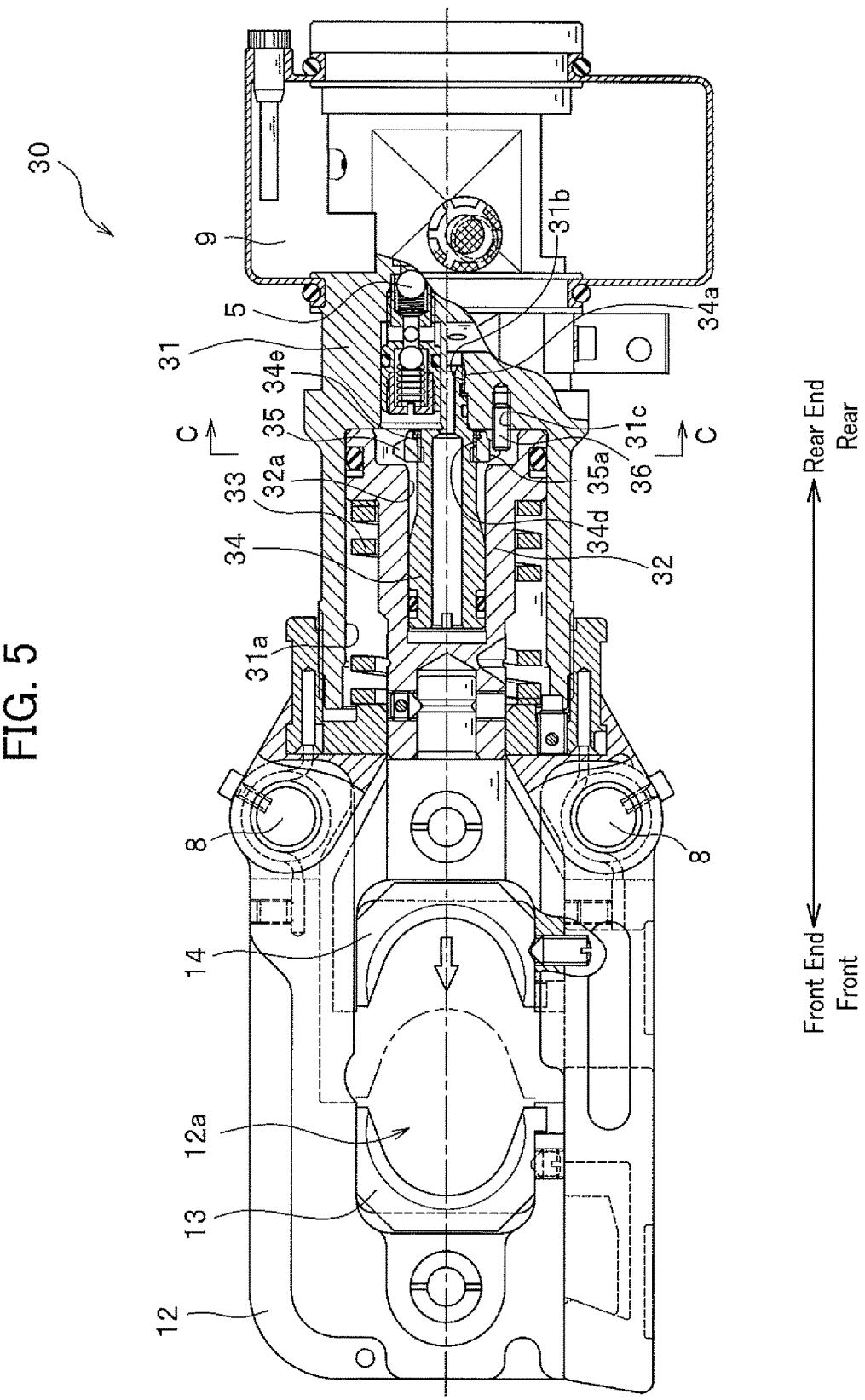
FIG. 5 is a cross-sectional view illustrating the structure of the conventional hydraulic tool.
Figure 6:
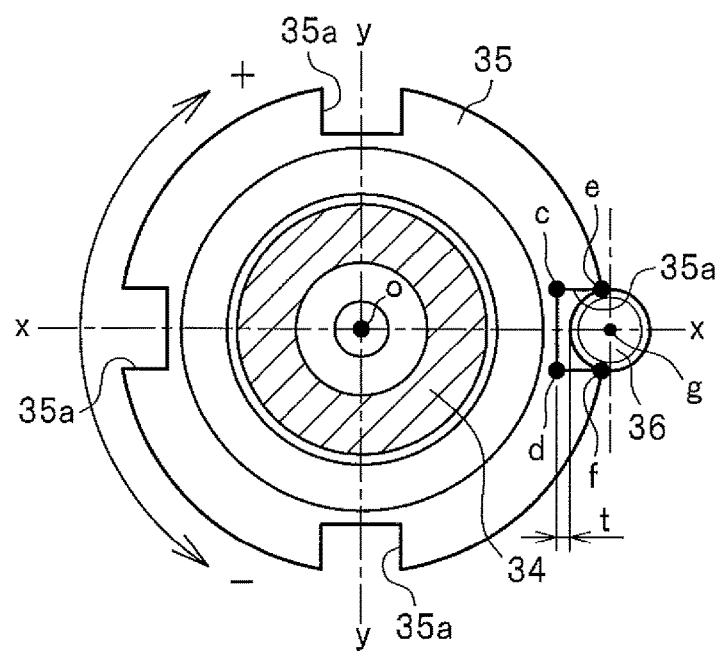
FIG. 6 is a cross-sectional view along the line C-C indicated in FIG. 5, and is a magnified sectional view illustrating a rotation stopping of the conventional fast-feed piston.

As illustrated in FIG. 4, D-cut surfaces 4h are formed on the outer circumference of the rear end portion 4g of the fast-feed piston 4 to have four sides (square) in cross-sectional view.

Since the other features of this case are the same as the case with the single D-cut surface, the same descriptions are omitted.

In the case with the D-cut surface on four sides, surface alignment can be performed by rotation of at most 90 degrees.

<Principle of Rotation Stopping of Fast-Feed Piston 4>

The Principle of rotation stopping of the fast-feed piston 4 is as follows. For example, when it is assumed that the angle θ formed between the line oa and the line oc in the triangle oac is 30 degrees, and the length of the line oc is 6.0 mm, the length of the line oa is 6.93 mm, which is 0.93 mm greater than the length of the line oc.

Therefore, the D-cut surface 4h perpendicular to the centerline o-g is in contact with the setscrew 6 at the point c. When the fast-feed piston 4 rotates, the D-cut surface 4h interferes with the setscrew 6, and thus the setscrew 6 exercises the rotation stopping function.

A procedure for installing the rotation stopper for the fast-feed piston 4 is explained below with reference to FIG. 4.

1) As illustrated in FIG. 1, the O-ring 4f is fitted into the O-ring groove 4i, which is formed on the outer circumference of the fast-feed piston 4 (on two sides).

2) The male thread 4d on the connection portion 4b of the fast-feed piston 4 is screwed into the female thread 11b in the body 11, a flat-bladed screwdriver is inserted into the slot 4e, and the male thread 4d is screwed into the female thread 11b (See FIG. 1) to the end.

3) As illustrated in FIG. 4, the fast-feed piston 4 is rotated in the loosening direction (of the arrow→-) within a range of at most 90 degrees. In the position in which the D-cut surface 4h first becomes perpendicular to the centerline o-g, the setscrew 6 is screwed into the female thread 11c (See FIG. 1) to fix the setscrew 6.

Further, an adhesive may be applied to the threaded portion of the setscrew 6 for preventing loosening of the setscrew 6.

Thus, the procedure for installing the rotation stopper is completed.

The operations of the hydraulic tool 10 are explained.

1) For example, in the case where a workpiece is pressure joined, the operator inserts the workpiece into the opening 12a which is formed by the fixed die 13 in the frame 12 and the movable die 14, and pushes a start button (not shown).

Then, the operating oil from the oil tank 9 passes through a check valve 5, and flows into the through-hole 4c, and then into the third cylinder chamber 2g, so that the piston 2 is pressed to the position at which the workpiece should be located immediately before the processing and the load is relatively low, and the movable die 14 is moved forward in a fast-feed manner.

2) When the movable die 14 reaches the workpiece and a heavy load is imposed, the fast feed with the fast-feed piston 4 is completed, and the hydraulic circuit (not shown) is switched, so that the operating oil is fed into the second cylinder chamber 2a in the piston 2. Thus, the piston 2 is pressed against the bias force of the rectangular-wire helical spring 3 to a vicinity of the stroke end, and the processing of pressure joining is performed with the fixed die 13 and the movable die 14.

3) After completion of the processing, when the operator manipulates a return lever (not shown), the hydraulic circuit is switched to a drain circuit, and the operating oil in the first cylinder chamber 11a is drained to the oil tank 9, so that the piston 2 returns to the initial position because of the bias force of the rectangular-wire helical spring 3.

Various modifications and changes are possible within the technical idea of the present invention, and the present invention naturally includes such modified and changed inventions.

Although the fixed tool is illustrated as the fixed die 13, the fixed tool may be a stationary blade.

In addition, although the movable tool is illustrated as the movable die 14, the movable tool may be a movable blade.

In addition, the D-cut surface(s) which can engage with the setscrew 6 may be formed on a single side or on multiple sides in cross-sectional view.

Alternatively, the multiple D-cut surfaces may be formed on four sides forming a square in cross-sectional view, or on six sides forming a hexagon in cross-sectional view, and may be further alternatively formed on multiple sides forming a pentagon, a heptagon, or an octagon in cross-sectional view.

Further, the rear end portion 4g of the fast-feed piston 4 may have the shape of a flange with a diameter greater than the outer diameter φD of the trunk portion 4a. Furthermore, the fixing member 6 may be a dowel pin or key.

LIST OF REFERENCE SIGNS

2: Piston
2a: Second Cylinder Chamber
2b: Diameter-Enlarged Portion
2c: O-Ring Groove
2d: Diameter-Reduced Portion
2e: Attachment Hole
2f: O-Ring
2g: Third Cylinder Chamber
3: Rectangular-Wire Helical Spring
4: Fast-Feed Piston
4a: Trunk Portion
4b: Connection Portion
4c: Through-Hole
4d: Threaded Portion (male thread)
4e: Slot
4f: O-Ring
4g: Rear End Portion
4h: Flat Face (D-Cut Surface)
4i: O-Ring Groove
5: Check Valve
6: Setscrew (Fixing Member)
6a Screw Member
8: Pin
9: Oil Tank
10: Hydraulic Tool
11: Body
11a: First Cylinder Chamber
11b, 11c: Female Thread
11d: Hydraulic-Pressure Communication Hole
12: Frame
12a: Opening
13: Fixed Die (Fixed Tool)
14: Movable die (Movable Tool)
14b: Attachment Portion

The invention claimed is:

1. A hydraulic tool comprising:
a body;
a frame which is detachably connected to the body, and in which a fixed tool and a movable tool are arranged, where the fixed tool and the movable tool process a workpiece;
a piston which has a tubular shape and is slidably arranged in the body to move the movable tool; and
a fast-feed piston inserted in the piston and connected to the body; wherein
the fast-feed piston includes,
a trunk portion arranged in sliding contact with an inner circumference of the piston,
a connection portion arranged in a rear end portion of the trunk portion and connected to the body,
a threaded portion formed in the connection portion, and
a D-cut surface formed on the trunk portion;
the hydraulic tool further comprises a fixing member which is arranged in the body in contact with the D-cut surface;
the D-cut surface is formed along a direction perpendicular to a straight line connecting a center point of the trunk portion and a center point of the fixing member; and
rotation of the fast-feed piston is stopped by the fixing member.

2. The hydraulic tool according to claim 1, wherein the fixing member is a screw member.

3. The hydraulic tool according to claim 1, wherein the D-cut surface is formed in plurality, and the D-cut surfaces are four sides of a square in cross-sectional view.

* * * * *